United States Patent
Güpner et al.

(10) Patent No.: US 6,195,709 B1
(45) Date of Patent: Feb. 27, 2001

(54) METHOD OF PROVIDING PERSISTENCY FOR TRANSIENT OBJECTS IN OBJECT ORIENTED TECHNOLOGY

(75) Inventors: Juan Roldan Güpner, Holzgerlingen; Stephanie Meizer, Zornheim, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/033,228

(22) Filed: Mar. 2, 1998

(30) Foreign Application Priority Data

Jul. 24, 1997 (DE) .................................. 97112662

(51) Int. Cl.[7] .................................. G06F 15/177
(52) U.S. Cl. .................................. 709/316
(58) Field of Search .................................. 709/315, 316

(56) References Cited

U.S. PATENT DOCUMENTS

| | | | |
|---|---|---|---|
| 5,481,721 | * | 1/1996 | Serlet et al. .................. 709/315 |
| 5,721,918 | * | 2/1998 | Nilsson et al. .................. 707/202 |
| 5,727,203 | * | 3/1998 | Hapner et al. .................. 707/103 |
| 5,872,932 | * | 2/1999 | Schettler et al. .................. 709/226 |
| 6,009,266 | * | 12/1999 | Brownell et al. .................. 709/315 |
| 6,016,489 | * | 1/2000 | Cavanaugh et al. .................. 707/8 |

OTHER PUBLICATIONS

"IBM/JOSS Object Services Persistence Service Specification" IBM Corporation, SunSoft, Inc, 1993.*

* cited by examiner

Primary Examiner—Kenneth R. Coulter
(74) Attorney, Agent, or Firm—Owen J. Gamon

(57) ABSTRACT

A method of providing persistency for an object (O) to be a persistent object, in an object oriented application, comprising the steps of associating (102) a proxy object (PO) with said object (O), creating (103) a persistent object representation (111) of said object in a persistent data store (112), receiving a message (105), sent by a client object (CO) to said object (O), by said proxy object (PO), forwarding (107) said message to said persistent object by said proxy object (PO), receiving (108) a result of said forwarded message from said persistent object by said proxy object (PO), updating (109) said persistent object representation (111) by said proxy object (PO), and returning (110) said result of said message to said client object (CO) by said proxy object (PO).

14 Claims, 2 Drawing Sheets

METHOD OF PROVIDING PERSISTENCY FOR TRANSIENT OBJECTS IN OBJECT ORIENTED TECHNOLOGY

FIELD OF THE INVENTION

The invention relates to a method of providing persistency for transient software objects, in an object oriented application.

DESCRIPTION OF THE PRIOR ART

Object Oriented Technology or simply Object Technology, often abbreviated "OOT" or simply "OT", describes a method for the development of software for a computer system. In contrary to the traditional, non object oriented ways of developing software, Object Oriented Technology comprises and uses preengineered "classes" for the development of software, comparable to tools and parts for the development of an automobile. A class groups together data and the procedures to operate on those data. In Object Oriented Technology the procedures are referred to as methods. The data is only accessible through the methods provided by the class.

Data means information or space in a computer program where information can be stored, e.g. a name or an inventory part number. Procedures are parts of a program that cause the computer to actually do something, e.g. the parts of a program which perform calculations or the part of a program that store something on a computer disk.

Similar to the development of an automobile, wherein not each required screw is developed individually, but standardized screws are used which can be individually adapted by shortening to the required length, within the development of software, Object Oriented Technology provides a "class" as a kind of software template from which individual "objects" can be instantiated. These objects are also referred to as instances of a class. Invoking a method on an object is referred to as "sending a message" to that object. The data of an object make up the so called "state" of an object.

Classes may be stored in a software library or a so called "class library". A class library is simply a collection of several classes stored together in a special filing format called a library.

The concept of an object being a self-contained piece of software having data and procedures inside itself is a new way of developing software. In non object oriented software, data and procedures for processing these data are very independent of each other. Hence, when changing the structure of a data element, the programmer must be aware of the impact on the related procedures, i.e. procedures operating on the data element, in order to prevent the application from malfunction.

This conventional method worked okay for smaller programs, but as soon as a piece of software started to grow and become somewhat complex, it became increasingly difficult to figure out which procedures were using which data. This made it quite difficult and expensive to maintain and change traditional software programs.

In Object Oriented Technology it is generally easier to debug, maintain, and enhance object oriented software. The most popular object oriented programming languages are probably "C++", "Smalltalk", and "Java". The concept that data are only accessible through the corresponding methods is called "encapsulation". Part of the concept of encapsulation is that an object has a predictable way of communicating with other objects, a so called predictable "interface".

Provided that the class interface will not be changed, the implementation of methods can be changed without disrupting other objects' ability to interact with objects of that class. For example, a TAX CALCULATION object would have a predictable interface for use by PAYCHECK objects. Provided that interface will not be changed, the detailed program code inside the TAX CALCULATION object could be changed whenever the tax laws changed, and no other objects in the payroll system would have to know anything about such changes.

In Object Oriented Technology the term "inheritance" is used to communicate the concept that one class can inherit part of its behavior and data from another class, e.g. since an employee is a specific type of person, an EMPLOYEE class might inherit the characteristics of a PERSON class, such as having name, birth date, and address data, as well as an EMPLOYEE class might inherit methods for updating and displaying these data.

Even if a class inherits some of its characteristics from other objects, that class can, and usually would, also have its own non-inherited characteristics, e.g. whereas a PERSON class would have a method to display a person's address, a PERSON class would probably not have a method for displaying paycheque history, since not all persons get paychecks. Because getting a paycheque is a common characteristic of all employees, an EMPLOYEE class would have to define its own method for displaying paycheque history.

Persistent objects are those objects whose lifetime is not bound to the lifetime of the process they were created by. The lifetime of these objects is arbitrary, determined by some application, and their state is kept in a nonvolatile data store. From that persistent store the objects can be "revived" (restored) when needed. The counterparts of persistent objects are transient objects: the lifetime of these objects is clearly limited by the lifetime of the creating process. Almost any business application requires some objects to be persistent and thus an elaborate persistency concept is of great value.

A typical way to provide persistency in object oriented applications is to introduce classes that implement the persistency mechanism, e.g. a persistent object base class. Classes that are to have persistent instances must inherit from at least one of the introduced classes. Often it is also necessary to adapt method implementations or to provide a certain interface.

A similar concept yet having less impact on the application code is again to add some classes responsible for persistency. These classes rely on a certain set of interfaces being implemented by those classes that need persistency. Inheritance is not required.

A third concept is to simply use the persistency services offered by additional classes or libraries. These libraries may be class libraries but could be also function libraries. Neither inheritance nor implementation of special interfaces is required.

Conventional persistency concepts show the drawback that reengineering of existing applications is a must, i.e. new functionality has to be added to all classes that are to have persistent instances (by adding classes, by introducing a common base class or by extending existing classes). Any of the above mentioned concepts will force an application programmer to redesign his application and to rewrite parts of the code. Furthermore, code must be changed, e.g. in order to store or restore objects from the persistent data store.

OBJECT OF THE INVENTION

It is therefore an object of the present invention to provide a persistency mechanism that does not require any changes to existing classes.

It is another object of the present invention to provide a persistency mechanism that allows transient objects to become persistent objects at any point in time without effort.

SUMMARY OF THE INVENTION

The present invention solves the above mentioned problems with a method of providing persistency for an object to be a persistent object as layed down in enclosed independent claims.

For the solution as disclosed in the present invention, the following terms are used:

An "object" is a transient object. If a persistent object has to be designated, the term "persistent object" is used. The term "persistent data" or "persistent object representation" is used for data in a persistent store that describe a persistent object. The term "persistent object" is used for an object that resides in the main memory and has a representation in a persistent store. The term "persistent store" or "persistent storage" is used for a permanent storage medium like a hard disk or a tape.

The term "proxy" or "proxy object" is used for an object that replaces a persistent object in the face of the client. The term "transient object" is used for an object that resides in the main memory but has no representation in a persistent store. The lifetime of these transient objects is clearly limited by the lifetime of the process that created the object. The term "object" is rather used instead of "transient object".

The solution provides a proxy concept wherein each persistent object is associated with a proxy object. The proxy object replaces the persistent object in the face of the client object and is responsible for creation and maintenance of the object's persistent representation. It is transparent to the client that it is not directly dealing with the persistent object but with that object's proxy, because the proxy object is acting as a router between the client (primary sender of messages) and the persistent object (intended receiver of messages).

It is advantageous that to the client object it is transparent whether a persistent object has already been restored from the persistent store and exists in the main memory or whether it still has to be "revived", realizing a "single level store" concept. It is furthermore advantageous, that all updates to persistent objects in the main memory are propagated to the persistent store without client interaction; it appears to the client as if he was dealing with one single (persistent) store. Furthermore it is advantageous that a persistency mechanism is provided which does not require any changes to existing classes and which allows transient objects to become persistent objects at any point in time without effort.

Wherein an update is only performed if necessary, i.e. if the state of an object has changed. This provides performance improvements. An implementation of this feature could be to compare the state of an object after the retrieval step with its state before the updating step. If the states differ the persistent store will be updated. Otherwise the updating step can be skipped.

Instead of loading a persistent object from the persistent store each time a message is sent, "caching" can be implemented. The persistent object will only be loaded on first touch, i.e. the first time a message is sent to the persistent object, or when the persistent representation has changed since the persistent object was last loaded. Within this application, the term "cache" is used only in a logical sense. This means, that the cache can be, and usually is, a part of the main memory in which persistent objects are kept, but does not preclude that this part of the main memory is a specific hardware memory device with particular short access time to the data. This is advantageous as it speeds up the method by reducing the number of storage accesses and therefore improves overall system performance.

One possible realization of the caching mechanism is: Before the retrieval step the cache is queried for the required persistent object. If the persistent object cannot be obtained from the cache, the persistent object is loaded from the persistent store and inserted into the main memory. Otherwise the persistent object is taken from the cache and thus, the persistent store does not need to be accessed. An updating step remains unchanged, except that the persistent object will remain in main memory (in the cache) instead of being removed.

Whenever an object is shared between (i.e. concurrently accessed and/or updated by) multiple users, processes or threads, a locking mechanism is provided. There are mainly two kinds of locking: optimistic and pessimistic locking. Both can be applied to this persistency concept in order to make it suitable for multiuser, multiprocess or multithread environments.

It is advantageous to collect information on the evolution of a persistent object so that a former state of the persistent object may be reconstructed. A sophisticated logging mechanism will allow a complete restoration of former states of a persistent object. With the present persistency concept a message based logging can easily be provided: After each updating step the proxy object writes information on the updated persistent object to a special log file. This information may include the name of the updated persistent object, any changed instance variables, the performed message. Another possible mechanism to record the evolution of a persistent object is versioning. Each time the persistent object is updated, a persistent copy of that object is created and associated with a version identifier. To implement versioning within this persistency concept, code to create the copy and the version information could be inserted before the updating step. The version identifier may be a time stamp or a sequential number. The copy could be a complete copy or an incremental copy, i.e. only the changes between subsequent persistent object states are recorded.

Transactions are used to ensure consistency. The present invention considers two transaction models:

1. On Object Level

A transactional mode that is effective for single persistent objects. Changes to a persistent object in transactional mode are only preliminary: they can still be taken back but can as well be committed (made persistent) at the end of a transaction. Changes made in a transaction are committed or rejected as a whole. This transaction model can be realized by adding the following methods to the proxy object's interface: begin (starts a transaction), commit (performs an update of the persistent object in the persistent store), and rollback (undoes any changes made to the persistent object since the last begin).

2. Including Multiple Objects

The traditional transaction concept: A set of interactions between a set of persistent objects is defined as transaction. Either the whole set of interactions becomes effective or none of them. To realize the traditional transaction model a transaction manager object is necessary (e.g. the proxy class object). The transaction manager has to provide begin, commit and rollback operations and must maintain the set of objects participating in a transaction.

Nested transactions are transactions performed within other transactions (subtransactions). Committing a nested transaction will make the changes performed within that transaction visible to the containing transaction. Performing a rollback of a nested transaction will restore each participating object to the state it had before the start of the nested transaction. Updates of persistent data are only made when the out most transaction commits.

Parts of an object can be designated as persistent or as non persistent. Sometimes, only parts of an object need to be persistent. Consider the following example: A customer account object exists that maintains account status information and has also a reference to a visual table. That table is used to display the account data on the screen. Only the account status information needs to be persistent, the visual representation can be transient. In such cases the programmer should be enabled to designate parts of an object either as persistent or as non persistent (transient). It should also be possible for him to describe how to initialize the non persistent parts of an object when that object is retrieved from a persistent store. A possible implementation of partial persistency could be to provide each class with a special interface that allows to determine those parts of an object that are to be persistent.

DETAILED DESCRIPTION OF A PREFERRED EMBODIMENT

Figure 1:
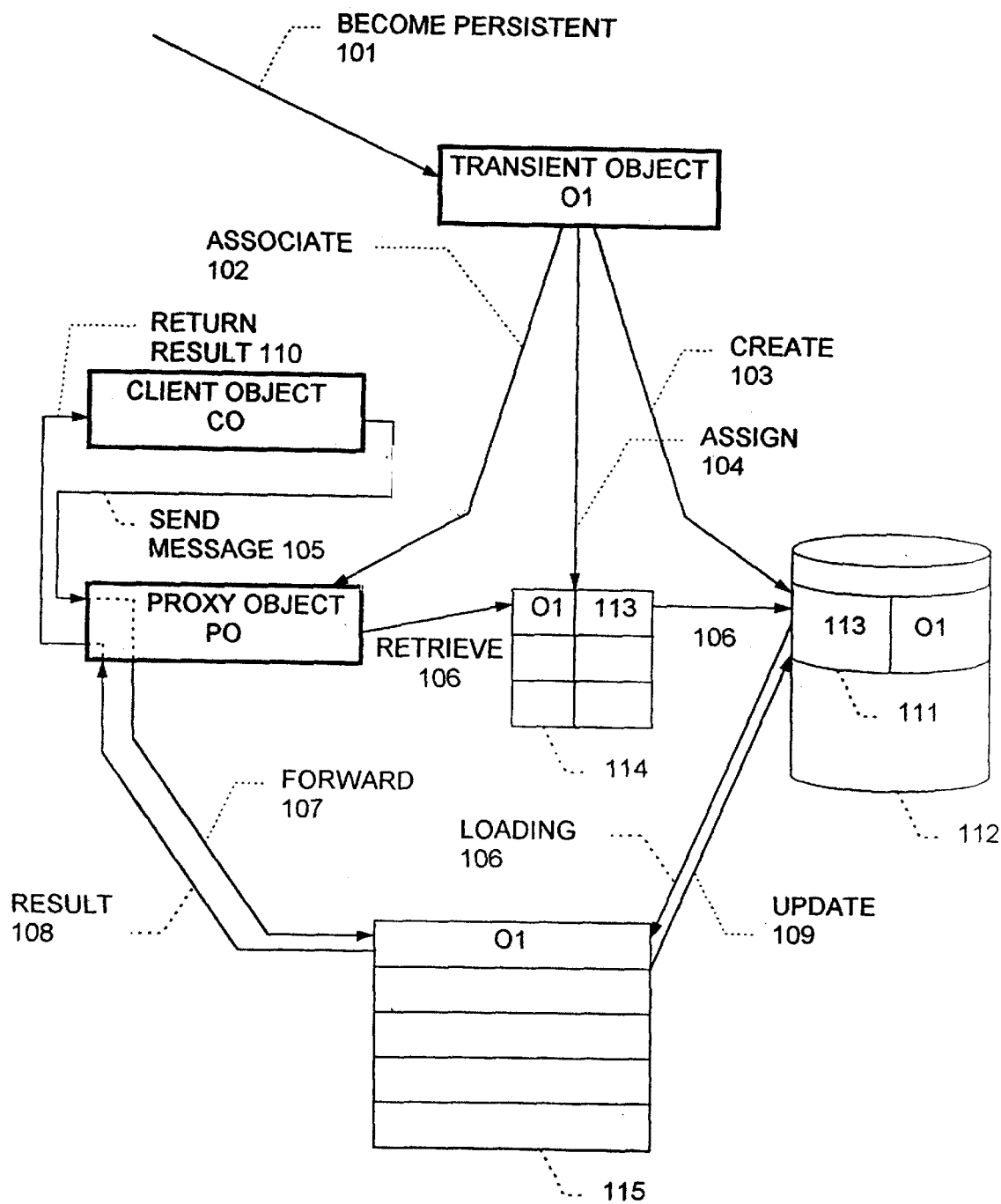
FIG. 1 shows the transformation of an existing transient object into a persistent object according to the present invention.

FIG. 1 shows the transformation of an existing transient object into a persistent object according to the present invention.

For the creation of persistent objects there are two substantial different possibilities:

1. Creation of a new object as a persistent object. When an object is created as a persistent object, both the proxy object and the persistent object representation exist from the beginning in parallel.
2. Transformation of an existing object into a persistent object. When an object has been created as a transient object and has to be transformed into a persistent object, that object can be told to make itself persistent. In that case a proxy object will be created and associated with the object. All references to the transient object will be substituted by references to the proxy object using an appropriate method known in the art. Moreover, a persistent representation of the object will be created in the persistent data store. Usage of this mechanism is almost transparent to the client object. The client only needs to decide when to transform the transient object into a persistent one. Subsequently, there is no difference in working with transient objects versus working with persistent objects.

FIG. 1 shows the procedure, if a transient object 0 is requested to become persistent 101. Then a proxy object PO is associated 102 and a persistent object representation 111 is created 103 and stored on a hard disk 112 as a persistent data store using an identifier 113 stored in an identifier table 114. Persistent objects are identified by either a user given identifier, i.e. a user alias, or a system generated identifier. The identifier is assigned 104 to the persistent object at creation time. An application can retrieve a persistent object by its identifier.

Whenever a client object sends a message to a persistent object, that message is first received by the proxy object associated to said persistent object. The proxy object then performs the following actions, each action will be given a name for further reference:

1. It restores the persistent object it replaces from a persistent store (retrieval step).
2. It forwards the message to the restored persistent object and receives the result of the forwarded message (forwarding step).
3. It moves the persistent object back to the persistent store (updating step).
4. It returns the result of the message to the client object (returning step).

In order to receive and send messages a persistent object needs to be loaded from the persistent store into a main memory. That action is triggered by the persistent object's proxy object and is hidden from the client object.

When a message, sent by a client object CO and addressed to the object O1, is received 105 by the proxy object PO for object O, the proxy object PO retrieves 106 the object O using the identifier 113 and loads the persistent object from said persistent data store 112 into a cache memory 115. Then the message is forwarded 107 to said persistent object by said proxy object PO. The proxy object PO receives 108 the result of said forwarded message from said persistent object O.

Subsequently the persistent object O is restored 109 to the persistent data store 112 thereby updating said persistent data store 112. Finally the result is returned 110 to the client object CO by said proxy object PO.

Figure 2:
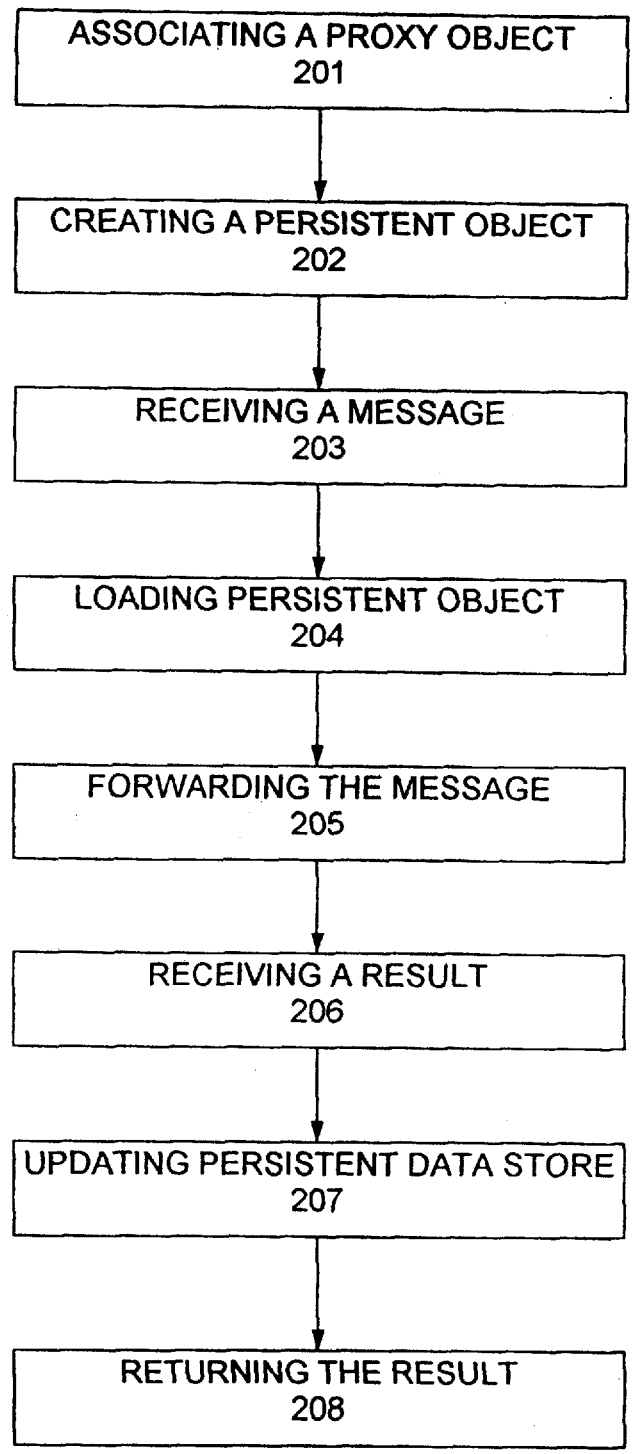
FIG. 2 shows a diagram representing a particular embodiment of the inventive method.

The FIG. 2 shows a diagram representing an particular embodiment of the inventive method.

The inventive method of providing persistency for an object to be a persistent object, in an object oriented application, starts with associating a proxy object 201 with said object. Then a persistent object representation of said object is created 202 in a persistent data store. Then a message, sent by a client object to said persistent object, is received 203 by said proxy object. Subsequently the persistent object is loaded 204 from the persistent data store into a main memory by said proxy object, preferably only if a message is sent to said persistent object for the first time or if said persistent object representation has been changed since said persistent object has been loaded previously. Then the message is forwarded 205 to said persistent object by said proxy object. After receiving the result 206 of said forwarded message from said persistent object by said proxy object, the persistent object is stored back to said persistent data store, thereby updating 207 said persistent data store. Finally, the result of said message is returned 208 to said client object by said proxy object.

What is claimed is:

1. A method of providing persistency for a transient object to be a persistent object, in an object oriented application, said method comprising the steps of:

associating a proxy object with said transient object;

creating a persistent object representation of said transient object in a persistent data store;

receiving a message, sent by a client object to said transient object, by said proxy object;

loading said persistent object from said persistent data store into a main memory by said proxy object, if a message is sent to said persistent object for the first time or if said persistent object representation has been changed since said persistent object has been loaded previously;

forwarding said message to said persistent object by said proxy object;

receiving a result of said forwarded message from said persistent object by said proxy object;

updating said persistent data store by storing said persistent object back to said persistent data store by said proxy object; and and returning said result of said message to said client object by said proxy object.

2. The method of claim 1, wherein the updating step further comprises:

updating said persistent data store by storing said persistent object back to said persistent data store by said proxy object, only if the state of said persistent object has been changed by said message.

3. The method of claim 1, further comprising the steps of:

searching for said persistent object in a cache; and loading said persistent object from said persistent data store into said cache by said proxy object, if said persistent object is not found in said cache by said searching step.

4. The method of claim 1, further comprising the steps of:

locking said persistent object representation before the step of forwarding said message to said persistent object; and releasing said persistent object representation after the step of updating said persistent data store.

5. The method of claim 1, further comprising the step of:

collecting information on the evolution of said persistent object.

6. The method of claim 1, wherein transactions are used to ensure consistency.

7. The method of claim 1, wherein parts of an object can be designated as persistent or as non persistent.

8. A computer program product for providing persistency for a transient object to be a persistent object, in an object oriented application in a computer system, said computer program product comprising:

means for associating a proxy object with said transient object;

means for creating a persistent object representation of said transient object in a persistent data store;

means for receiving a message, sent by a transient object to said transient object, by said proxy object;

means for loading said persistent object from said persistent data store into a main memory by said proxy object, if a message is sent to said persistent object for the first time or if said persistent object representation has been changed since said persistent object has been loaded previously;

means for forwarding said message to said persistent object by said proxy object;

means for receiving a result of said forwarded message from said persistent object by said proxy object;

means for updating said persistent data store by storing said persistent object back to said persistent data store by said proxy object;

means for returning said result of said message to said client object by said proxy object; and a data storage medium capable of being read by said computer system, wherein said data storage medium bears all of said means.

9. The computer program product of claim 8, farther comprising:

means for loading said persistent object from said persistent data store into a main memory by said proxy object, if a message is sent to said persistent object for the first time or if said persistent object representation has been changed since said persistent object has been loaded previously.

10. The program product of claim 8, further comprising:

means for searching for said persistent object in a cache; and means for loading said persistent object from said persistent data store into said cache by said proxy object, if said persistent object is not bound in said cache by said searching means.

11. The program product of claim 8, further comprising:

means for locking said persistent object representation before forwarding said message to said persistent object; and means for releasing said persistent object representation after updating said persistent data store.

12. The program product of claim 8, further comprising:

means for collecting information on the evolution of said persistent object.

13. The program product of claim 8, wherein transactions are used to insure consistency.

14. The program product of claim 8, wherein parts of an object can be designated as persistent or as non-persistent.

* * * * *